Dec. 11, 1928.
F. F. PEASE
1,694,666
SEPARATING APPARATUS
Filed Dec. 2, 1922   2 Sheets-Sheet 1
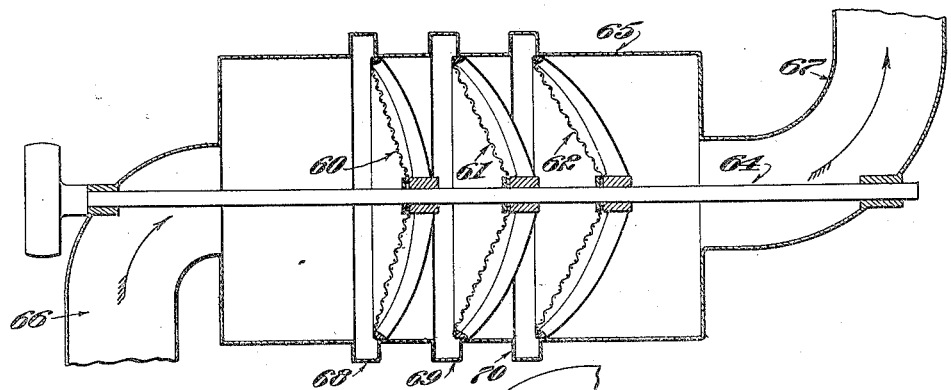
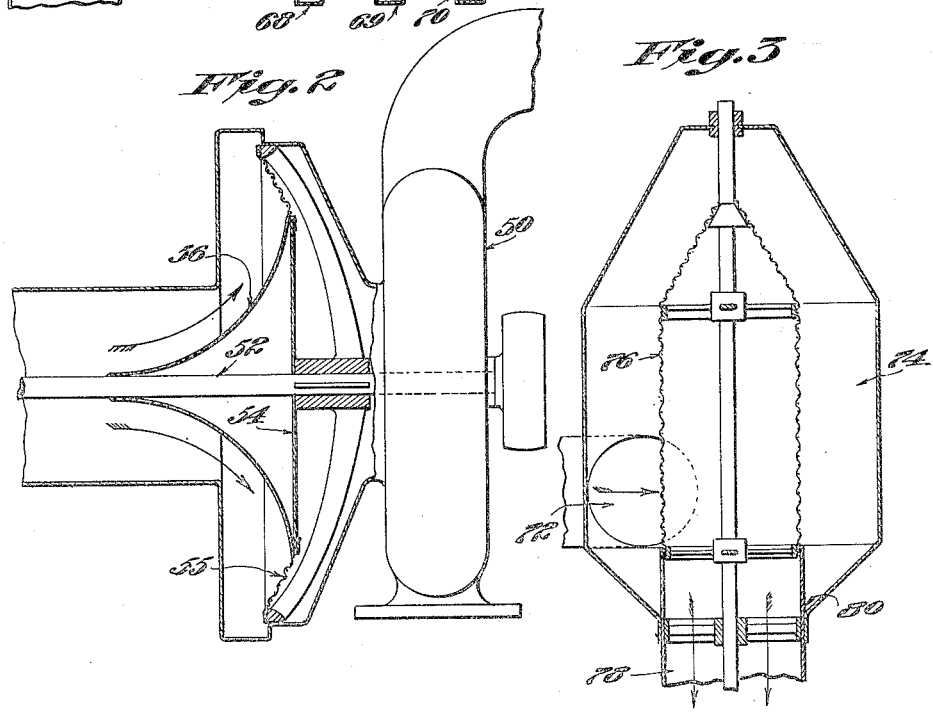

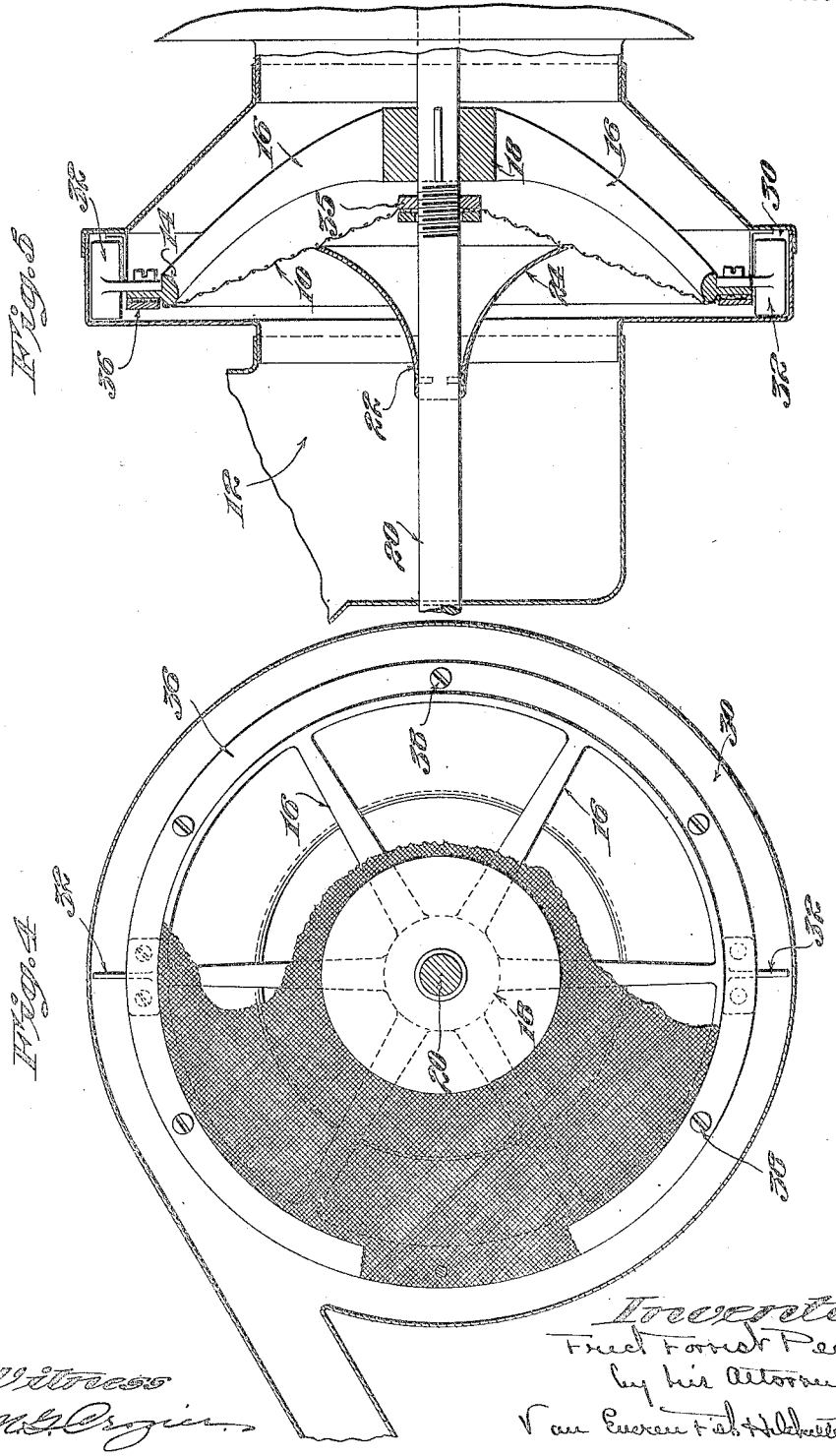

Patented Dec. 11, 1928.

1,694,666

UNITED STATES PATENT OFFICE.

FRED FORREST PEASE, OF EAST BRAINTREE, MASSACHUSETTS, ASSIGNOR TO F. F. PEASE INC., OF BOSTON, MASSACHUSETTS, A CORPORATION OF MASSACHUSETTS.

SEPARATING APPARATUS.

Application filed December 2, 1922. Serial No. 604,483.

The present invention relates to apparatus more particularly designed for the separation of suspended matter from air or other gas.

Various expedients have been adopted for the separation of solid and liquid matter from currents of air or gas and it is the purpose of the present invention to provide a new and improved form of apparatus for accomplishing such a separation, more particularly the separation of suspended solid matter in the form of dust from a body of gas.

With this object in view, one feature of the invention contemplates the provision of a moving separator which permits the gaseous medium to pass therethrough but which is substantially impervious to the passage of suspended matter. This is accomplished through the provision of a moving barrier provided with openings therein and inclined with respect to the direction of flow of the gas. With a moving barrier or separator of this character positioned at the proper inclination to the direction of flow of the gas it is found that a substantial separation of suspended matter from the gas may be accomplished even though the openings through the barrier are as large or substantially larger than the suspended matter which it is desired to separate from the gas.

In a simple and efficient form of the invention a revolving screen having a generally conical form is interposed in a closed duct or passage through which the gas flows. The suspended matter impinges upon this conical surface while the gas passes through the openings in the screen and the rotation of the screen through centrifugal force causes the separated matter to be moved outwardly and thrown off tangentially into a suitable collector. Generally speaking, if the inclination of the screen surface is increased, the same separation may be accomplished with larger screen openings. On the other hand, as the inclination of the screen is decreased, or, in other words, as the form of screen approaches more nearly that of a flat disk, the size of the screen openings must more nearly approach the size of the suspended particles in order to accomplish the desired separation.

It will be evident that this method of separation, owing to the relatively large screen openings which may be employed, does not offer any substantial impedance to the flow of the gas and in this respect alone is far superior to the ordinary methods of separation, which require exceedingly small openings to accomplish the separation of fine particles with a consequently large resistance to the flow of the gas. Furthermore the employment of a comparatively coarse mesh screening or separation device permits the use of a rugged construction which may be operated for long periods and for the separation of comparatively coarse particles from the gas, which would soon destroy the ordinary form of separator.

It should be furthermore understood that by a proper design of the screen openings, together with the inclination of the screen surfaces, a progressive and selective separation may be accomplished. In other words, a screen of proper mesh and inclination may be first interposed to separate comparatively large particles from the gas, permitting the gas with suspended matter to pass freely therethrough. Thereafter this suspended matter may be separated through the employment of properly designed screens which eventually accomplish a complete separation of suspended matter from the gas. This progressive separation of suspended matter from a gas may be employed in connection with the separation of suspended matter of different specific gravities, the heavier suspended matter being first separated from the gas containing lighter matter and thereafter a complete separation of all the suspended matter being effected.

Such a method is particularly useful in connection with the cleaning of starch used in the molding of fondant centers, this starch after its removal from the fondant centers containing larger particles of sugar or tailings, as they may be technically termed. With the present method of separation performed progressively, the tailings or particles of sugar may be first separated from the more finely divided starch and thereafter a substantially complete separation of the starch from the air may be effected. This method not only effects the desired separation of the tailings from the starch and the starch from the air but in addition permits the thorough drying of the starch through the employment of hot, dry air, which absorbs moisture contained in the starch.

Still further features of the invention consist in certain novel features of construction, combinations and arrangements of parts hereinafter described and claimed, the advantages of which will be obvious to those skilled in the art from the following description.

In the accompanying drawings illustrating the preferred form of the invention Fig. 1 represents a partially diagrammatic view of a series of revolving screens employed for the separation of suspended matter from the gas; Fig. 2 is a similar view illustrating a revolving screen designed for handling comparatively large volumes of gas moving at a relatively slow speed; Fig. 3 is a diagrammatic view of a modified form of apparatus designed for the separation of exceedingly fine particles of suspended matter from a gas; Fig. 4 is a front elevation of a form of separating device which may be preferably employed for separation; and Fig. 5 is a section in elevation of the separating screen shown in Fig. 4.

As shown in the embodiment of the invention illustrated by Figs. 4 and 5, a revolving screen separator indicated at 10 is received within an air duct 12 and is interposed in the path of the dust laden air, flowing in the general direction indicated by the arrow. This screen is substantially conical in form and is secured at its outer periphery to the rim 14 of a revolving spider having supporting arms 16 extending from a hub 18. This hub is keyed to a drive shaft 20 which is rotated at the proper speed to impart the desired speed of movement to the surface of the screen. The central portion of the screen is preferably rendered inoperative through the employment of a head 22 having a smooth tapered periphery 24, which is designed to direct dust laden air toward the outer peripheral surface of the screen. With this construction, the dust laden air which is caused to move through the duct or passage 12 by a suitable form of blower engages with the revolving screen 10, the air passing through the screen while the suspended matter impinging upon the screen is held thereby. The rapid rotation of the screen serves thereafter to draw the solid particles outwardly into a collecting channel 30 surrounding the periphery of the screen. This not only maintains the surface of the screen free from the collection of solid matter but in addition collects the thus separated matter in a convenient receptacle. The separated dust may be removed from the collecting channel 30 through the employment of blades 32 extending from the spider and revolving therewith in the collecting channel. These blades serve to deliver the solid matter in the form of dust into a discharge duct 34. If so desired, the inner portion of the screen 10 may be connected to a separate head 35, which is adjustable lengthwise of the shaft 20, this head permitting the employment of screens of different inclination in accordance with the character of the work which is to be done. The outer peripheral edge of the screen is conveniently clamped in place to an annular band 36, which is connected to the periphery of the spider by fastening means 38. The revolving separator may be mounted upon the same shaft with the blower for drawing the air therethrough, or, if so desired may be driven through any suitable connection at a different speed. Under certain conditions it may be desirable to operate the separator through a separate drive, as this permits a variation of speed of the separator.

It will be evident to those skilled in the art from the foregoing description that as the angle or pitch of the separating surface is increased the same size of openings will effect the separation of smaller particles of suspended matter. On the other hand, this increase of pitch or inclination creates an increased resistance to the outward movement of the particles, as the centrifugal force exerted upon the separated matter is compelled to move the particles in a direction counter to the flow of the gas.

In certain instances where it is desired to handle a comparatively large volume of gas with a separator mounted upon the shaft with a relatively slow speed blower the construction indicated somewhat diagrammatically in Fig. 2 may be conveniently employed. As shown in this figure the blower is indicated at 50 as connected to a shaft 52 and mounted upon the same shaft is a revolving separator comprising an imperforate disk 54 having an annular inclined separator screen 55 connected to the periphery. The dust laden gas may be directed against this inclined screen by a generally conical head 56. With a construction of this character, the separator screen 55 may be caused to travel at a relatively high speed even though the shaft 52 may be rotating at a comparatively slow speed, owing to the large size of the imperforate disk 54. Such a construction affords the desired separating surface for handling large volumes of dust laden gas and permits the movement of the surface at the desired rate of speed, even though the separator is connected directly to a slow speed blower. The progressive separation of suspended matter from a gas may be accomplished as indicated generally in Fig. 1, in which a plurality of revolving screens, indicated respectively at 60, 61 and 62 are interposed in the path of the gas. These screens may be designed to accomplish first a separation of the relatively coarser or heavier matter from the more finely divided or lighter matter and to thereafter completely remove all of the suspended matter from the gas. It will be evident to those skilled in the art that this result may be attained by properly gaging the size of the screen openings, together with the inclination of the surfaces. As indicated generally, the several screens are mounted upon a shaft 64 which may be connected to any suitable form of drive and revolve in a closed chamber 65 connected at opposite ends with inlet and discharge ducts 66 and 67. The separated matter may be collected in chambers 68, 69 and 70 respectively.

Where it is desired to remove suspended matter consisting of very finely divided particles, it may be desirable to employ a separator of the general form indicated in Fig. 3. In this form of separator, the dust laden gas is discharged tangentially through an opening 72 into a vertical chamber 74. The gas thereafter encounters a cylindrical separator 76 revolving at a comparatively high rate of speed and covered with bolting cloth or similar material which will effect a separation of exceedingly fine particles from a gas. The gas after its passage through the surface of the separator 76 flows downwardly through a passage 78 and thence out of the separator. The separated matter in the meantime is thrown off from the surface of the separator tangentially and is collected in the lower portion 80 of the chamber.

What is claimed is:

1. An apparatus for the separation of suspended matter from gas comprising a duct or chamber for the passage of gas therethrough, a plurality of screen surfaces disposed within the duct, means for supporting the screen surfaces at different inclinations with respect to the direction of flow of the gas, and means for moving the screen surfaces transversely of the direction of flow of the gas.

2. An apparatus for the separation of suspended matter from gas comprising a plurality of rotatable screens, means for supporting the screens at different inclinations, means for revolving the screens, and means for compelling a flow of gas therethrough.

FRED FORREST PEASE.